March 24, 1964  J. J. ASTLEFORD, JR., ETAL  3,126,500
THERMALLY RESPONSIVIVE DEVICE Filed May 12, 1959                           2 Sheets-Sheet 1

WITNESSES
John E. Heasly, Jr.
Clement L. McHale

INVENTORS
John J. Astleford, Jr., Thomas P. Henry
& Merrill G. Leonard
BY
F. E. Browder
ATTORNEY March 24, 1964    J. J. ASTLEFORD, JR., ETAL    3,126,500
THERMALLY RESPONSIVIVE DEVICE
Filed May 12, 1959    2 Sheets-Sheet 2

United States Patent Office 3,126,500
Patented Mar. 24, 1964

3,126,500
THERMALLY RESPONSIVE DEVICE
John J. Astleford, Jr., Hickory Township, Mercer County, Pa., and Thomas P. Henry, Brookfield Township, Trumbull County, and Merrill G. Leonard, Fowler, Ohio, assignors to Westinghouse Electric Corporation, East Pittsburgh, Pa., a corporation of Pennsylvania
Filed May 12, 1959, Ser. No. 812,632
10 Claims. (Cl. 317—14)

This invention relates to thermally responsive devices, and more particularly to thermally responsive devices employed with certain types of electrical apparatus, such as transformers.

In certain types of conventional electrical apparatus, such as distribution transformers, thermally responsive devices are provided for actuating associated signaling or protective equipment upon the occurrence of predetermined load or operating conditions in said apparatus. In transformers operating in a cooling or insulating fluid, such as oil, a thermally responsive or temperature responsive element or a number of such elements may be employed for mechanically actuating an associated circuit breaker to protect a transformer from damage which might result from overheating caused by overloading of the transformer, as disclosed in U.S. Patent 2,597,185 filed by F. C. Roeding et al. and assigned to the same assignee as the present application. In order that such thermally responsive devices respond more closely to the copper or winding temperature of the associated electrical apparatus, such thermally responsive devices are commonly located or disposed so that they are substantially immersed in the insulating fluid of the associated apparatus and heated both in accordance with the temperature of said fluid and in accordance with the current flowing in the windings of the associated electrical apparatus. The temperature of the insulating fluid reflects long time thermal loads on such apparatus and the instantaneous current flowing in the windings reflects short time thermal loads on such apparatus. In a conventional protective system of the type described, either all or a portion of the current flowing in the windings of the associated electrical apparatus also flows in the thermally responsive devices or elements which mechanically actuate the associated protective or signaling equipment upon the occurrence of predetermined load or operating conditions in said apparatus.

As the required ratings of electrical apparatus, such as distribution transformers, increase, the currents which flow in the thermally responsive devices in the associated protective systems of a conventional type also increase, as well as the mechanical forces involved in interrupting the current flow in the windings of such apparatus when the associated protective equipment, such as circuit breakers, is mechanically actuated by said thermally responsive devices. It is therefore desirable to provide an improved thermally responsive device in which the current flow and the control energy requirements are reduced compared to conventional devices of the same general type and which is particularly adapted for actuating electrically operated protective equipment, such as the circuit breaker disclosed in our copending application, Serial No. 801,843, filed March 25, 1959, and issued August 1, 1961 as U.S. Patent No. 2,994,753, and additionally for actuating electrically operated associated signaling equipment in an over-all protective system as disclosed in our copending applications, Serial No. 812,-633, filed May 12, 1959, and Serial No. 57,772 filed September 22, 1960.

It is an object of this invention to provide a new and improved thermally responsive device for actuating signaling or protective equipment associated with an electrical apparatus upon the occurrence of predetermined operating or load conditions.

Another object of this invention is to provide a new and improved thermally responsive device which is heated in accordance with the heating of an associated electrical apparatus such as a transformer and in which the current flow in said device and the control energy requirements are reduced.

A further object of this invention is to provide a thermally responsive device for actuating electrically operated signaling or protective equipment associated with an electrical apparatus, such as a transformer, upon the occurrence of certain predetermined operating or load conditions.

Other objects of the invention will in part be obvious and will in part appear hereinafter.

For a fuller understanding of the nature and objects of the invention, reference should be had to the following detailed description taken in connection with the accompanying drawing, in which.

Figure 4:
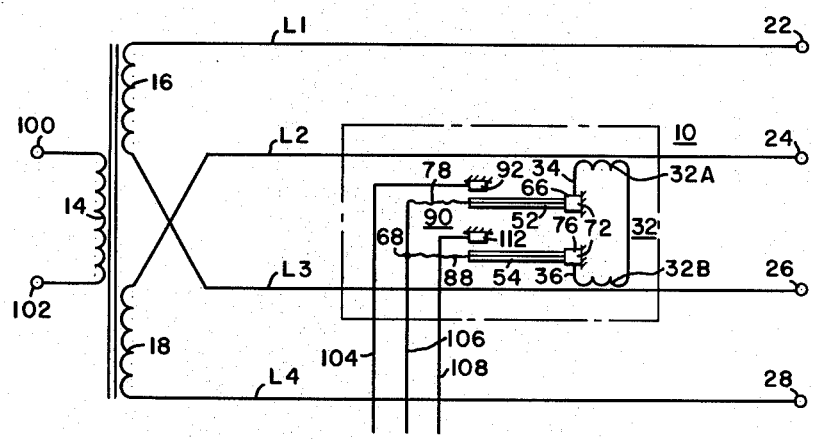
FIG. 4 is a diagrammatic view of circuits and apparatus comprising a transformer and the associated thermally responsive device organized in accordance with one embodiment of the invention.
Figure 5:
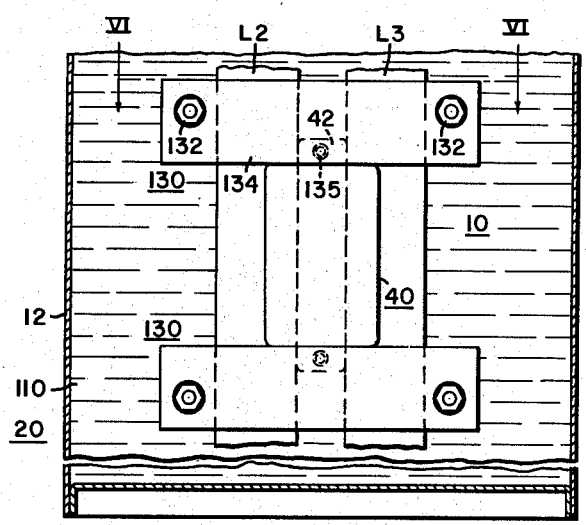
FIG. 5 is a partial elevational view illustrating the mounting arrangement of a thermally responsive device, as shown in FIG. 1, on the leads of the associated electrical apparatus.

Referring now to the drawings and FIGS. 4 and 5 in particular, there is illustrated an electrical apparatus, more specifically a transformer 20, having a tank or casing 12 enclosing a primary winding 14 and a secondary winding, shown as having first and second secondary winding portions 16 and 18, said windings being substantially immersed in a cooling or insulating fluid 110. The insulating fluid 110 may be of any suitable type, such as an insulating oil. The first and second secondary winding portions 16 and 18 are connected to the distribution circuit conductors or terminals 22 and 26 and 24 and 28, respectively, by the secondary leads L1 and L3 and L2 and L4, respectively, which carry electrical current from said secondary winding portions to and from whatever load is connected at said distribution circuit conductors. In particular applications, the secondary winding portions 16 and 18 may be connected either in series or parallel circuit relation with respect to each other or with respect to the distribution circuit conductors 22, 24, 26 and 28. As mentioned previously, the heating of the transformer 20 results from the current flow in the secondary winding portions 16 and 18 and in the associated secondary leads L1 and L3 and L2 and L4, respectively, and the corresponding current flow in the primary winding 14 of said transformer.

In order to sense or measure the thermal load or operating condition of the transformer 20 and to actuate associated signaling or protective equipment (not shown) upon the occurrence of predetermined load or operating conditions, the thermally responsive device 10 is provided as shown diagrammatically in FIG. 4, said thermally responsive device including at least one thermally responsive element, such as the first and second bimetallic elements 52 or 54, respectively, which may be of any conventional type. As best shown in FIG. 5, the thermally responsive device 10 is substantially immersed in the same insulating fluid as the associated transformer 20 in order to heat said thermally responsive device in accordance with the temperature of said insulating fluid which reflects prolonged thermal loads on said transformer. In addition, as best shown in FIG. 4, the thermally responsive device 10 also includes means for heating the bimetallic elements 52 and 54 in accordance with the current flow in the windings of the transformer 20, more specifically the pick-up coil or current transformer winding 32 which includes the first and second winding portions 32A and 32B, respectively, disposed adjacent to the secondary leads L2 and L3, respectively, for producing an output current which varies with the sum of the currents in said secondary leads and which reflects short time loads on said transformer. The bimetallic elements 52 and 54 are connected in series circuit relationship, the series circuit being connected across the output of the pick-up coil 32 at the conductors 34 and 36, as a load or burden on said pick-up coil. Finally, the thermally responsive device 10 includes the contact means 90 which is actuated by the operation of the bimetallic elements 52 and 54 upon the occurrence of certain predetermined thermal load or operating conditions of the transformer 20 to thereby change the circuit connections of the conductors 104, 106 and 108 and to actuate the operation of associated signaling means, such as an indicating lamp (not shown), or protective equipment, such as a circuit interrupter or circuit breaker (not shown). It is to be noted that since the thermally responsive device 10 responds to predetermined thermal operating or load conditions of the transformer 20 to change the circuit connections of the conductors 104, 106 and 108, the thermally responsive device 10 is therefore particularly adapted for actuating electrically operated associated signaling or protective equipment, such as disclosed in our copending applications Serial No. 812,633, filed May 12, 1959 and Serial No. 57,772, filed September 22, 1960, as previously mentioned, rather than for actuating mechanically associated signaling or protective equipment.

Figure 1:
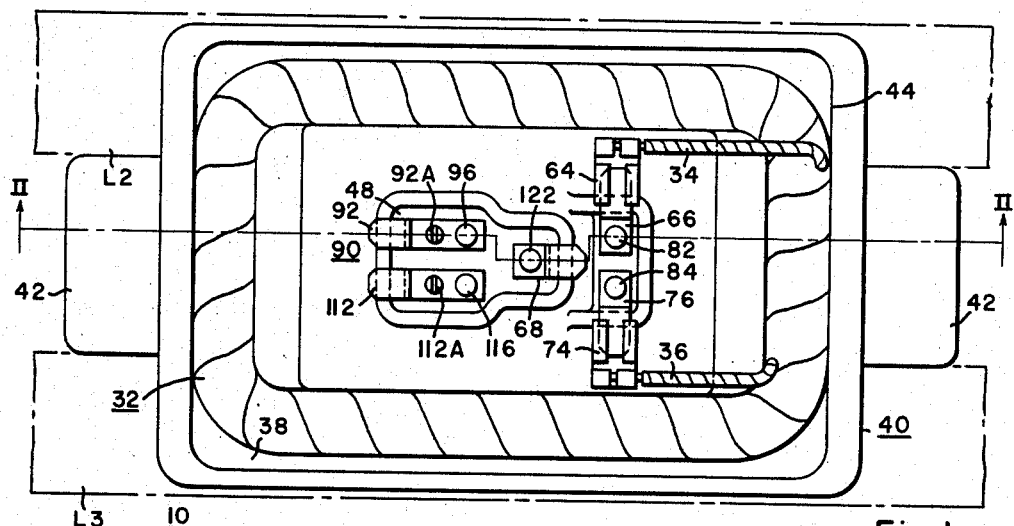
FIGURE 1 is a partial top plan view of a thermally responsive device embodying the principles of the invention with the leads of the associated electrical apparatus shown in phantom.
Figure 2:
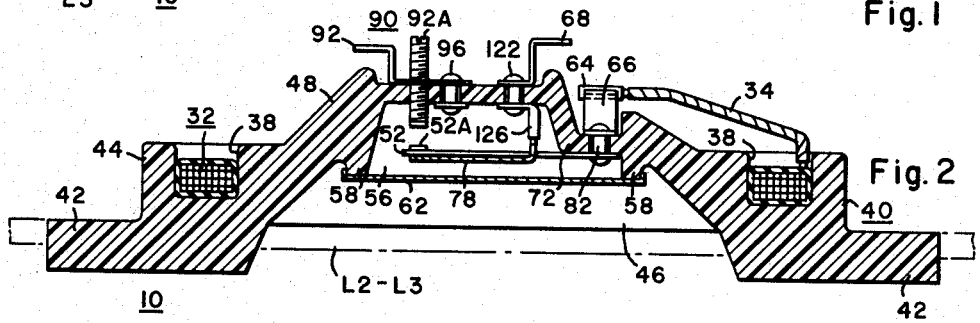
FIG. 2 is a sectional view taken along the line II—II of FIG. 1 and looking in the direction of the arrows.
Figure 3:
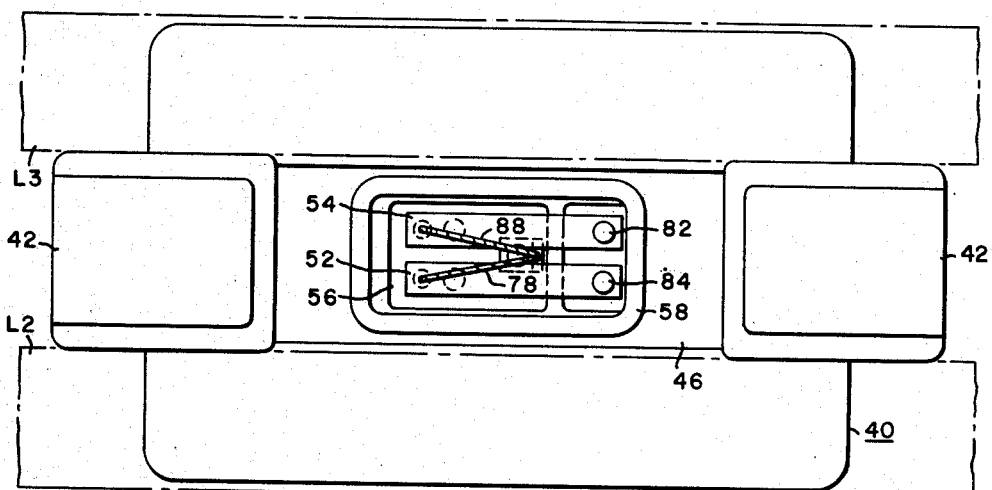
FIG. 3 is a bottom view of the device shown in FIG. 1, with a partition member removed.

In particular, as best shown in FIGS. 1 through 3, the thermally responsive device 10 comprises a base member 40, which is preferably molded from a suitable molding material, such as a glass polyester type of molding material. The base member 40 includes a main portion 44, which is generally rectangular in shape, a terminal plate portion 48, which projects generally upwardly from said main portion, a generally cup-shaped cavity or recess 46, a slot or recess which extends around and is adjacent to the outer periphery of said main portion, and mounting feet or extensions 42 at the opposite ends of said base member. In order to form a closed chamber or housing in the upper portion of the cavity 46, for reasons which will be discussed hereinafter, a partition or divider member 62 is disposed inside said cavity and sealed to the shoulder portion 58 of the base member 40 in a substantially fluid-tight joint by a suitable sealing or bonding material, such as an epoxy resin. The partition or cover member 62 is preferably formed from a material having a high thermal conductivity, such as a metal.

The pick-up coil or current transformer winding 32 is disposed in the slot 38 of the main portion 44 of the base member 40, as best shown in FIGS. 1 and 2, and includes a plurality of turns of an insulated conductor which are disposed in inductive relationship with or non-ferromagnetically coupled to the adjacent secondary leads L2 and L3 of the transformer 20. The pick-up coil 32 includes first and second winding portions 32A and 32B, respectively, which are disposed adjacent to the secondary leads L2 and L3, respectively, and effectively connected in series circuit relationship so that the output current induced in said pick-up coil when current flows in one or both of the secondary leads L2 and L3 varies with the sum of the currents in said secondary leads which conventionally flow instantaneously in opposite directions and the associated windings of the transformer 20. As best shown in FIGS. 1 and 2, the plane of the coil 32 is substantially parallel to and close to the plane of the conductors L2 and L3 so that there is good mutual coupling therebetween, in contrast with the substantially negligible mutual coupling that would exist if the coil were at or near a right angle with respect to the conductors. The output current of the pick-up coil 32 which appears at the output conductors 34 and 36 is applied to the bimetallic elements 52 and 54 through suitable clip-on type terminal connectors 64 and 74, respectively, which are electrically connected to the terminal members 66 and 76, respectively, which in turn are electrically connected to the ends of the bimetallic elements 52 and 54, respectively, by the rivets 82 and 84, respectively. It is important to note that due to the absence of a ferromagnetic core associated with the winding portions of the pick-up coil 32 that the output current of said pick-up coil varies in a substantially linear manner with the sum of the currents in the secondary leads L2 and L3 even during certain abnormal operating conditions of the transformer 20, such as during short circuit or fault conditions at the distribution circuit terminals 22, 24, 26 and 28. It is to be understood that in certain applications, separate or individual pick-up coils or current transformer windings may be provided for each of the secondary leads L2 and L3, rather than a single pick-up coil, as shown in FIGS. 1, 2 and 4.

The bimetallic elements 52 and 54 are preferably mounted or disposed inside the sealed chamber 56 of the base member 40 with one end of each of said bimetallic elements fixed or secured to the abutment or shoulder 72 of said base member by suitable fastening means, such as the rivets 82 and 84, respectively. The other or free ends of each of the bimetallic elements 52 and 54 are electrically connected to the common junction point or terminal 68 by the flexible conductors 78 and 88, respectively, through a connecting terminal 126 and a rivet 122 which also functions as a suitable fastening means for securing the terminals 68 and 126 to opposite sides of the terminal plate portion 48 of the base member 40, as best shown in FIG. 2. The common junction point or terminal 68 is also connected to associate signaling or protective equipment (not shown) by the conductor 106, as shown in FIG. 4. The bimetallic elements 52 and 54 are arranged to deflect or deform as the temperature or thermal condition of the transformer 20 changes with the free ends of the bimetallic elements 52 and 54 arranged to move in an upward direction to actuate the associated contact means 90 upon the occurrence of predetermined thermal load or operating conditions in the transformer 20. The temperature or thermal condition of the bimetallic elements 52 and 54 varies primarily with the temperature of the insulating fluid 110 of the transformer 20 for slowly changing load conditions of said transformer and primarily with the current flow in the secondary leads L2 and L3 and the associated windings of said transformer for rapidly changing load conditions of said transformer, particularly when large overload currents are flowing in the windings of said transformer. The bimetallic elements 52 and 54 may be arranged to actuate associated contact means upon the occurrence of substantially the same temperature or thermal condition of the transformer 20 or upon the occurrence of different predetermined thermal conditions or temperatures of said transformer. For example, the bimetallic element 52 may be arranged to actuate the contact means 90 and an associated signaling means, such as an indicating lamp (not shown), upon the occurrence of a first predetermined thermal condition of the transformer 20 and the bimetallic element 54 may be arranged to actuate the contact means 90 and an associated protective means, such as a circuit breaker (not shown), upon the occurrence of a second predetermined thermal condition of the transformer 20, which is preferably higher than the first predetermined thermal condition.

In order to reduce the size of the bimetallic elements 52 and 54 required in the thermally responsive device 10, the space in the sealed chamber 56 of the base member 40 is preferably at least partially filled with a suitable material, such as air, having a lower thermal conductivity than the insulating fluid 110 of the transformer 20. The latter arrangement reduces the heat transfer or loss from the bimetallic elements 52 and 54 during certain operating conditions, such as when the load on the transformer 20 is changing rapidly and the heating of said bimetallic elements is being controlled primarily by the current flow in the secondary leads L2 and L3 and the corresponding output current of the pick-up coil 32. As mentioned previously, the latter condition occurs primarily when the secondary leads L2 and L3 are carrying high overload currents. In general, the latter arrangement also reduces the required current through said bimetallic elements to obtain a predetermined heating of said elements and increases the over-all thermal efficiency of the device 10.

The contact means 90 comprises the movable contact members 52A and 54A, which are mounted or disposed on the free ends of the bimetallic elements 52 and 54, respectively, or formed integrally with said bimetallic elements, and the associated stationary contact members 92 and 112, respectively, which are mounted on the terminal plate portion 48 of the base member 40 and secured thereto by suitable fastening means, such as the rivets 96 and 116, respectively. The stationary contact members 92 and 112 include the adjustable contact posts or set screw contact members 92A and 112A, respectively. The adjustable contact posts 92A and 112A threadably engage the lower portion of the stationary contact members 92 and 112, respectively, and pass through the terminal plate portion 48 of the base member 40 into the chamber 56, the lower ends of the adjustable contact posts 92A and 112A being arranged to be engaged by the associated movable contact members 52A and 54A, respectively, upon the occurrence of predetermined load or operating conditions in the transformer 20. The distance or separation between the adjustable contact posts 92A and 112A and the associated movable contact members 52A and 54A, respectively, may be varied by the setting of said adjustably contact posts in order to vary the deflection required by the associated bimetallic members 52 and 54, respectively, as well as the corresponding thermal conditions of the transformer 20, to cause said contact members to be engaged or actuated to a circuit closing position for calibration purposes or to adjust the thermally responsive device for use with different ratings of associated electrical apparatus. The stationary contact members 92 and 112 are connected in circuit relation with associated signaling or protective equipment (not shown) by the conductors 104 and 108, respectively, so that when the bimetallic elements 52 or 54 actuate the movable contact members 52A and 54A, respectively, of the contact means 90 to circuit closing positions, closed circuits are formed between the common conductor 106 and either the conductor 104 or the conductor 108, respectively. The forming of the closed circuits just described by the thermally responsive device 10 in response to predetermined operating conditions of the transformer 20 may conveniently serve to energize or actuate electrically operated signaling or protective equipment, as previously mentioned, by connecting said equipment to a suitable source of electrical current.

Figure 6:
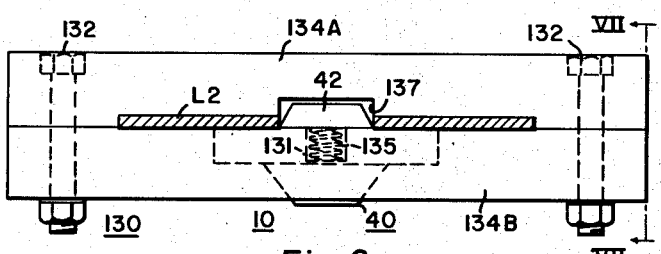
FIG. 6 is a partial top plan view taken along the line VI—VI of FIG. 5 and looking in the direction of the arrows; and, FIG. 7 is a partial elevational view, taken along the line VII—VII in FIG. 6, and looking in the direction of the arrows.
Figure 7:
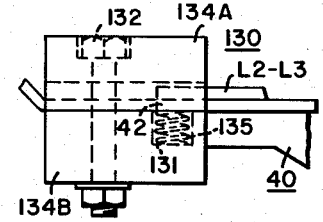

The spacing between the pick-up coil 32 in the thermally responsive device 10 and the leads of the associated electrical apparatus, such as a distribution transformer, has been found to be critical in order to obtain the best operating characteristics of said device and in order that the thermal characteristics of said device correspond more closely to the thermal condition or copper temperature of the associated electrical apparatus. Referring now to FIGS. 5 through 7, there is illustrated means for mounting the thermally responsive device 10 on the leads L2 and L3 of the transformer 20 and for maintaining substantially a predetermined spacing between the pick-up coil 32 of said device and said leads and, therefore, for maintaining substantially a uniform electromagnetic coupling between said leads and said device during substantially all operating conditions of the transformer 20.

In particular, the clamping or mounting means 130 is provided at each end of the thermally responsive device 10, as best shown in FIG. 5. As best shown in FIGS. 6 and 7, the clamping means 130 comprises a pair of cooperating block or strap members 134A and 134B for clamping one end of the thermally responsive device 10 to the leads L2 and L3 of the transformer 20. As shown in FIG. 6, the block or strap member 134A includes a first larger recess 138 which accommodates the leads L2 and L3 and a portion of one of the feet 42 and a second smaller recess 137 which accommodates a portion of one of the feet 42 of the thermally responsive device 10 which is disposed between the leads L2 and L3 and between the block or strap members 134A and 134B. The extremities or outer ends of the strap or block members 134A and 134B are preferably held together or secured by suitable means, such as the bolts 132 shown in FIG. 6. It is to be noted that the block or strap members 134A and 134B assist in preventing lateral movement of the leads L2 and L3 with respect to each other, such as might otherwise occur during certain abnormal operating conditions when heavy overload currents are flowing through said leads which would then tend to move away from each other laterally and change the spacing between said leads and the pick-up coil 32 of the thermally responsive device 10. In addition, a compression or biasing spring 135 is disposed in a recess 131 of the strap or block member 134B to bear against one of the feet 42 of the thermally responsive device 40 to thereby cause the main portion 44 of the base member 40 of said device to bear against the leads L2 and L3 of the transformer 20 even during abnormal operating conditions of said transformer, such as when heavy overload currents are flowing in the leads L2 and L3, when said leads might otherwise tend to deform and cause a separation or change in the spacing between said leads and the pick-up coil 32 of the thermally responsive device 10 intermediate the clamping means 130 which are disposed at the ends of said thermally responsive device.

In summary, the mounting arrangement just described tends to maintain substantially a predetermined desired spaced relationship between the pick-up coil 32 of the thermally responsive device 10 and the adjacent leads L2 and L3 of the transformer 20. As mentioned previously, the latter arrangement is important to maintain substantially a uniform electromagnetical coupling between the current in the leads L2 and L3 of the transformer 20 and the device 10 during substantially all operating conditions of said transformer.

It is to be understood that a thermally responsive device, as disclosed, may be employed with other types of electrical apparatus which include a winding substantially immersed in an insulating fluid to which current flows through associated leads to thereby cause heating of said apparatus. It is also to be understood that a thermally responsive device of the type disclosed may be employed with either single phase electrical apparatus as illustrated in the drawings or with three-phase or polyphase electrical apparatus of the same general type. As previously mentioned, a thermally responsive device, as disclosed, may include any number of thermally responsive elements equivalent to the bimetallic elements shown for purposes of illustration.

The apparatus embodying the teachings of this invention has several advantages. For example, the current flow and the control energy requirements in the thermally responsive elements of a thermally responsive device as disclosed are reduced compared to conventional thermally responsive devices of the same general type. In addition, a thermally responsive device as disclosed is particularly adapted for actuating associated electrically operated signaling or protective equipment employed with conventional electrical apparatus, such as distribution transformers. Finally, a thermally responsive device, as disclosed, lends itself more readily to coordination of the heating of the thermally responsive elements included in said device in response to slowly changing and rapidly changing loads on the associated electrical apparatus in order to create a thermal image or reflection which more closely corresponds to the thermal load or operating condition of the associated electrical apparatus and, in particular, to the copper or winding temperature of said apparatus.

Since numerous changes may be made in the above-described apparatus and circuits and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. A thermally responsive device for sensing the thermal condition of an associated electrical apparatus including windings substantially immersed in an insulating fluid and leads through which electric current flows to and from said windings in instantaneously opposite directions comprising a base member disposed adjacent to at least two of said leads and substantially immersed in said fluid, a current pick-up coil disposed on said base member for obtaining an output current which varies with the sum of the currents in said leads, the longitudinal axis of said out being substantially parallel to and closely positioned to the leads of the associated apparatus, said base member including a recess, one or more bimetallic elements disposed in said recess and connected in series circuit relation with said coil to be heated in response to said output current and the temperature of said fluid, movable contact means disposed in said recess, one end of each bimetallic element being fixed to said base member and the other end being free to move as the thermal condition of said apparatus changes and to actuate said movable contact, and stationary contact means disposed to be engaged by each movable contact for a predetermined thermal condition of said apparatus.

2. An electro-thermal control device for use with apparatus having at least two current carrying conductors comprising a generally rectangular coil for inductive coupling with said conductors and having a non-ferromagnetic core, the induced current in said coil being proportional to the sum of the currents in the conductors, a thermally responsive device having a heating circuit electrically connected in series with the coil, means providing two passages for each receiving one of the conductors, each of said conductors being closely positioned to and generally parallel to the longitudinal axis of the coil when disposed in said passages, and controlling means actuated by the thermally responsive device.

3. An electro-thermal control device for use with apparatus having to least two current carrying conductors comprising a generally rectangular coil for inductive coupling with said conductors and having a non-ferromagnetic core, first and second thermally responsive devices having heating circuits connected in series with said coil, means providing two passages for each receiving one of the conductors, each of said conductors being closely positioned to and generally parallel to the longitudinal axis of said coil when disposed in said passages, a first terminal connected to the series circuit across said coil, two other terminals and controlling means actuated by said thermally responsive devices, and the controlling means comprising contacts for connecting one or both of the other two terminals to said first terminal.

4. An electro-thermal control device for use with apparatus having at least two current carrying conductors comprising a generally rectangular coil for inductive coupling with said conductors, first and second thermally responsive devices having heating circuits connected in series with said coil, means providing two spaced substantially parallel passages for each receiving one of the conductors, each of said conductors being closely positioned to and generally parallel to the longitudinal axis of said coil when disposed in said passages, a first terminal connected to the series circuit across said coil, two other terminals and controlling means disposed within the opening of said coil actuated by said thermally responsive devices, and the controlling means comprising contacts for connecting one or both of the other two terminals to said first terminal.

5. A thermal control device comprising a body portion having passages adapted to receive at least two conductors carrying current in instantaneously opposite directions and including an internal chamber therein, a generally rectangular current pick-up coil having a non-ferromagnetic core and being disposed on said body portion and substantially linearly inductively coupled to said conductors when disposed in said passages for obtaining an output current which varies with the sum of the currents in said conductors, the longiutdinal axis of said coil being substantially parallel to and positioned closely to said conductors, one or more thermally responsive devices disposed in said chamber and connected in circuit relation with said coil to be heated by the output current of said coil, and control means actuated by the thermally responsive devices, said control means being arranged to be actuated to different operating positions by the operation of said thermally responsive devices as the thermal condition of said thermally responsive devices changes.

6. A thermal control device comprising a body portion having passages adapted to receive at least two conductors carrying current in instantaneously opposite directions and including an internal chamber therein, a generally rectangular current pick-up coil having a non-ferromagnetic coil and being disposed on said body portion and substantially linearly inductively coupled to said conductors when disposed in said passages for obtaining an output current which varies in a substantially linear manner with the sum of the currents in said conductors, the longitudinal axis of said coil being substantially parallel to and positioned closely to said conductors, one or more thermally responsive devices disposed in said chamber and connected in circuit relation with said coil to be heated by the output current of said coil, and control means actuated by the thermally responsive devices, said control means being arranged to be actuated to different operating positions by the operation of said thermally responsive devices as the thermal condition of said thermally responsive devices changes.

7. A thermally responsive device for sensing the thermal condition of electrical apparatus having at least two conductor leads in which electrical current flows instantaneously in opposite directions comprising a substantially rectangular insulating member adapted to receive said conductor leads in abutting relation at the opposite sides thereof, a substantially rectangular coil disposed on said insulating member with the longitudinal axis of said coil being substantially parallel to and positioned closely to the plane defined by the lead receiving portions of said insulating member, said coil being magnetically coupled to the currents which flow in said leads in a substantially linear manner to provide an output current which varies with the sum of the currents in said leads, and one or more thermally responsive devices disposed on said insulating member interiorly of the opening of said coil and connected in series across the ends of said coil.

8. A thermally responsive device for sensing the thermal condition of electrical apparatus having at least two spaced substantially parallel conductor leads in which electrical current flows instantaneously in opposite directions comprising a substantially rectangular insulating member adapted to receive said conductor leads in abutting relation at the opposite sides thereof, a substantially rectangular coil disposed on said insulating member with the longitudinal axis of said coil being substantially parallel to and positioned closely to the plane defined by the lead receiving portions of said insulating member, said coil being magnetically coupled to the currents which flow in said leads in a substantially linear manner to provide an output current which varies with the sum of the currents in said leads, and one or more thermally responsive devices disposed on said insulating member interiorly of the opening in said coil and connected in series across the ends of said coil, said insulating member having a spacer member at each end thereof which projects generally away from the plane of said member, said spacer members being adapted for positioning between said conductor leads in substantially aligned relation with respect to each other to maintain the position of said member with respect to said conductor leads.

9. An electro-thermal device adapted for sensing the thermal condition of electrical apparatus having at least two parallel spaced elongated conductor leads through which electrical current flows in instantaneously opposite directions to cause heating of said apparatus comprising a generally rectangular insulating supporting member adapted to receive said elongated leads along the longitudinal dimension thereof and in abutting relation at the opposite sides thereof, a substantially rectangular coil disposed on said supporting member, the longitudinal axis of said coil being substantially parallel to the plane defined by the lead receiving portions of said supporting member and in predetermined closely spaced relation with respect to the latter portions, the longitudinal portions of said coil underlying and being substantially aligned with the longitudinal dimensions of the lead receiving portions of said supporting member, said coil being inductively coupled to the currents which flow in said leads to provide an output current which varies with the sum of the currents in said leads in a substantially linear manner for all values of currents which flow in said leads, and one or more thermally responsive devices connected across the ends of said coil and disposed on said supporting member inside the opening of said coil.

10. A current sensing device for sensing the current flowing in two parallel conductors comprising a substantially rectangular coil loop, a generally rectangular insulating member disposed to support said coil loop and to substantially fill the opening of said coil loop, said insulating member being shaped to define a pair of substantially parallel conductor passageways which underlie the longitudinal portions of said coil loop at the opposite sides thereof for receiving said parallel conductors, said conductors when in said passageways carrying current in instantaneously opposite directions and being substantially parallel to the longitudinal axis of said coil loop and in predetermined closely spaced relation with respect to said coil loop to inductively couple the coil loop with both conductors, the portion of said insulating member disposed within the opening of said coil loop being adapted to support control means thereon.

References Cited in the file of this patent
UNITED STATES PATENTS

| | | |
|---|---|---|
| Re. 18,555 | Sperry | Aug. 2, 1932 |
| 1,517,258 | Smith | Dec. 2, 1924 |
| 1,686,666 | James | Oct. 9, 1928 |
| 1,692,486 | Cohn | Nov. 20, 1928 |
| 2,051,380 | Jones | Aug. 18, 1936 |
| 2,185,318 | Schmuding | Jan. 2, 1940 |
| 2,279,214 | Veinott | Apr. 7, 1942 |
| 2,282,986 | Wood | May 12, 1942 |
| 2,298,229 | Putman | Oct. 6, 1942 |
| 2,333,537 | Leonard | Nov. 2, 1943 |
| 2,358,215 | Darling | Sept. 12, 1944 |
| 2,452,961 | Smith | Nov. 2, 1948 |
| 2,523,117 | Jennings | Sept. 19, 1950 |
| 2,704,841 | Van Ryan | Mar. 22, 1955 |

UNITED STATES PATENT OFFICE
CERTIFICATE OF CORRECTION

Patent No. 3,126,500                                March 24, 1964

John J. Astleford, Jr., et al.

It is hereby certified that error appears in the above numbered patent requiring correction and that the said Letters Patent should read as corrected below.

Column 7, line 44, for "out" read -- coil --; line 65, and column 8, lines 1 and 16, for "passages for each receiving", each occurrence, read -- passages, each passage for receiving --; column 7, line 71, for "to" read -- at --.

Signed and sealed this 29th day of December 1964.

(SEAL)
Attest:

ERNEST W. SWIDER                                          EDWARD J. BRENNER
Attesting Officer                                              Commissioner of Patents